(No Model.) 7 Sheets—Sheet 1.
L. A. DESY.
DITCHING MACHINE.

No. 360,282. Patented Mar. 29, 1887.

Witnesses
Edw. W. Byrn
Solon C. Kemon

Inventor
L. A. Desy
By Munn & Co.
Attorneys

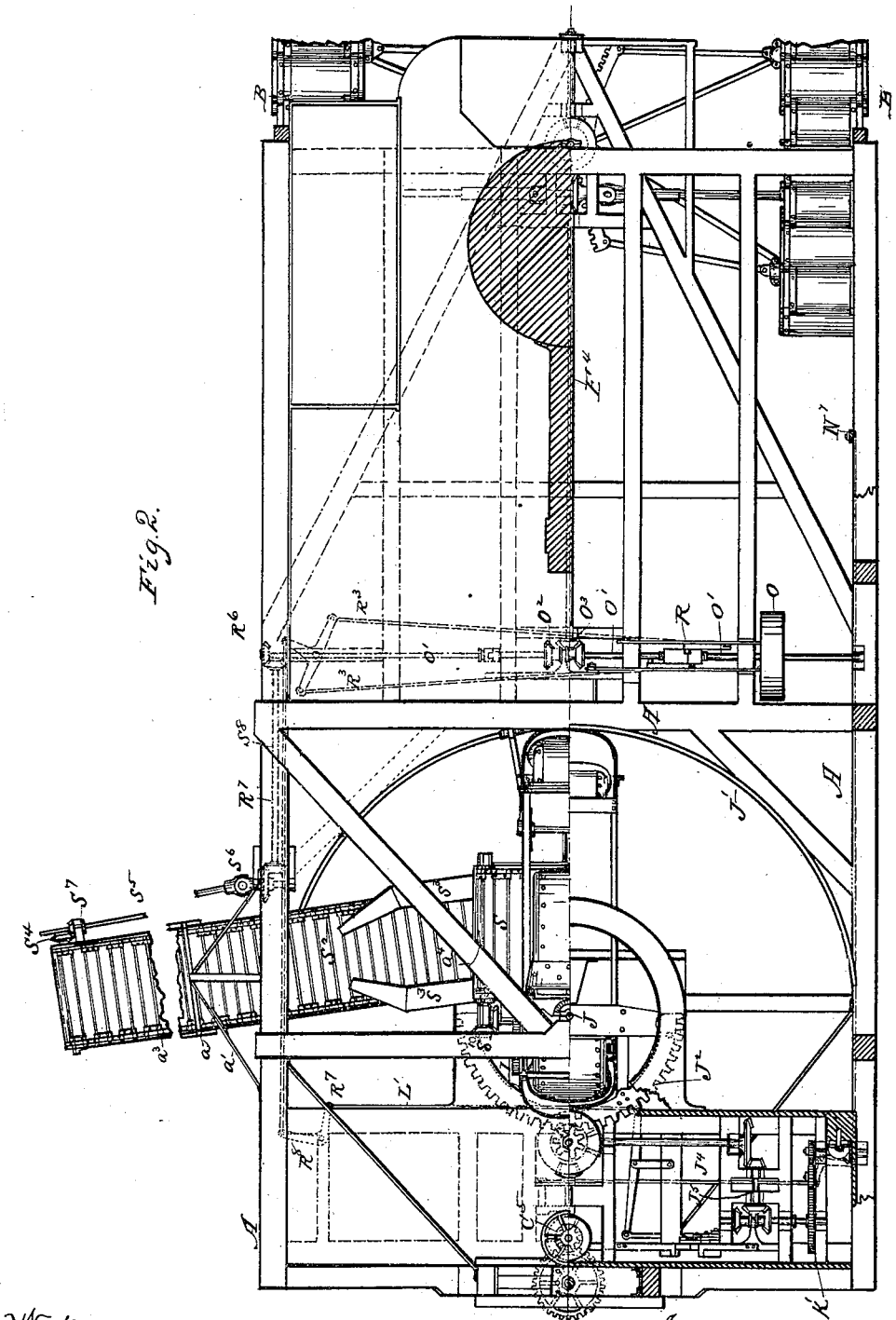

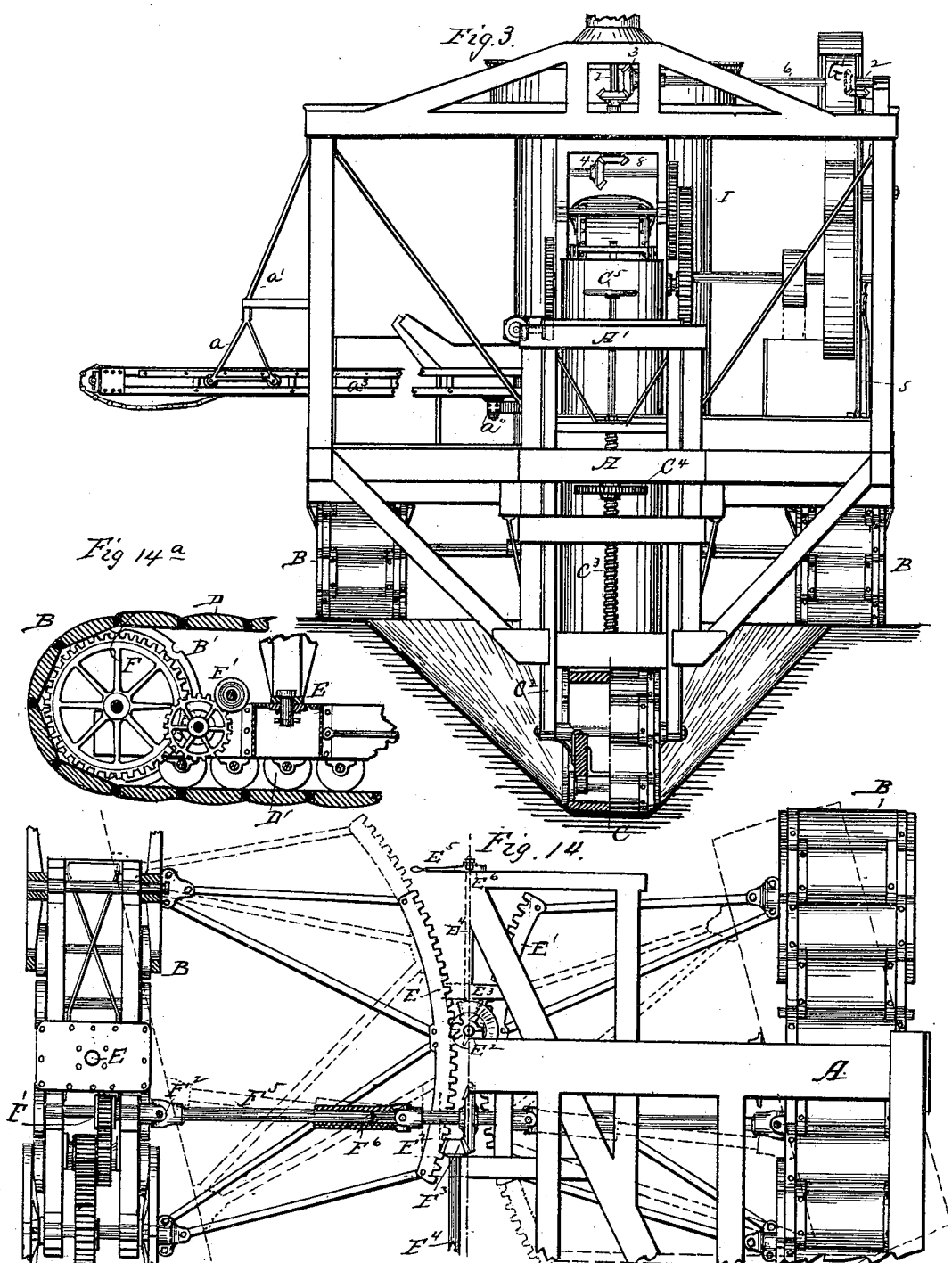

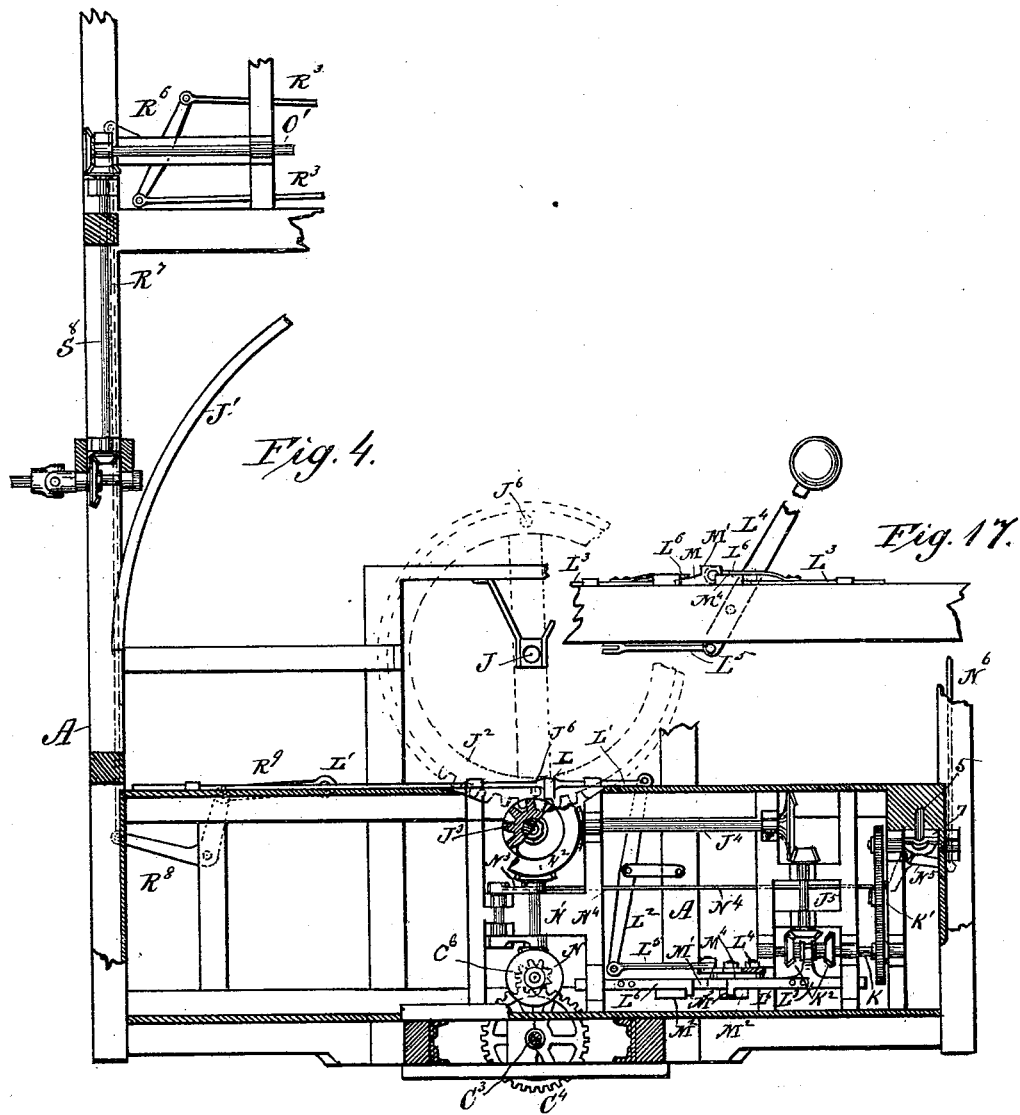

(No Model.) 7 Sheets—Sheet 5.
L. A. DESY.
DITCHING MACHINE.
No. 360,282. Patented Mar. 29, 1887.
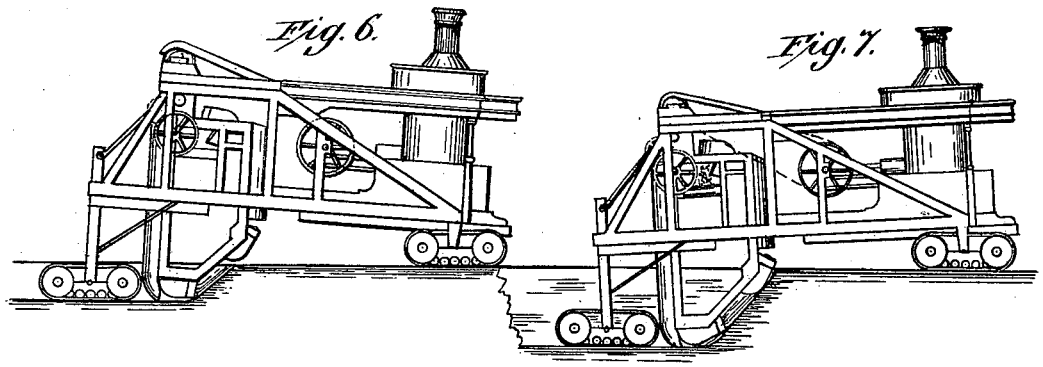
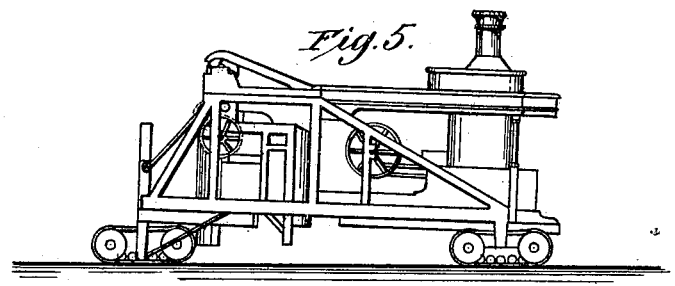
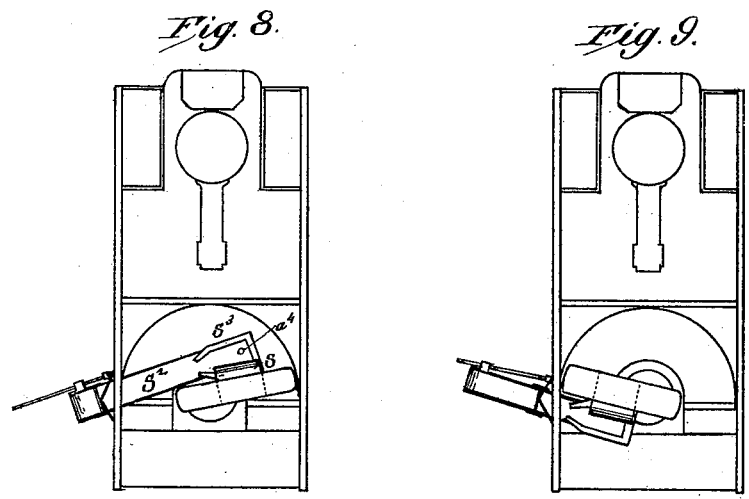

(No Model.) 7 Sheets—Sheet 6.

L. A. DESY.
DITCHING MACHINE.

No. 360,282. Patented Mar. 29, 1887.

Witnesses:
Joson C. Kennon
W. R. Stevens

Inventor.
L. A. Desy
By Munn & Co.
Attorneys.

(No Model.) 7 Sheets—Sheet 7.
L. A. DESY.
DITCHING MACHINE.
No. 360,282. Patented Mar. 29, 1887.
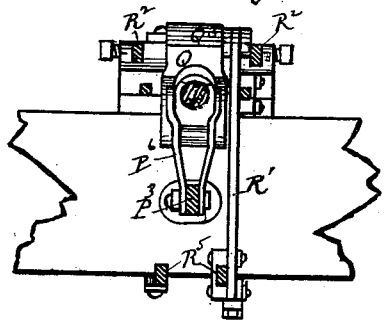
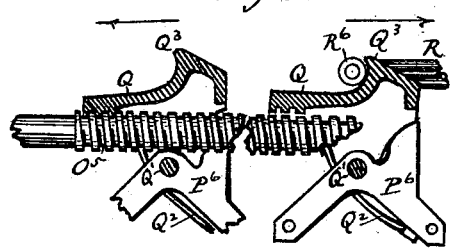
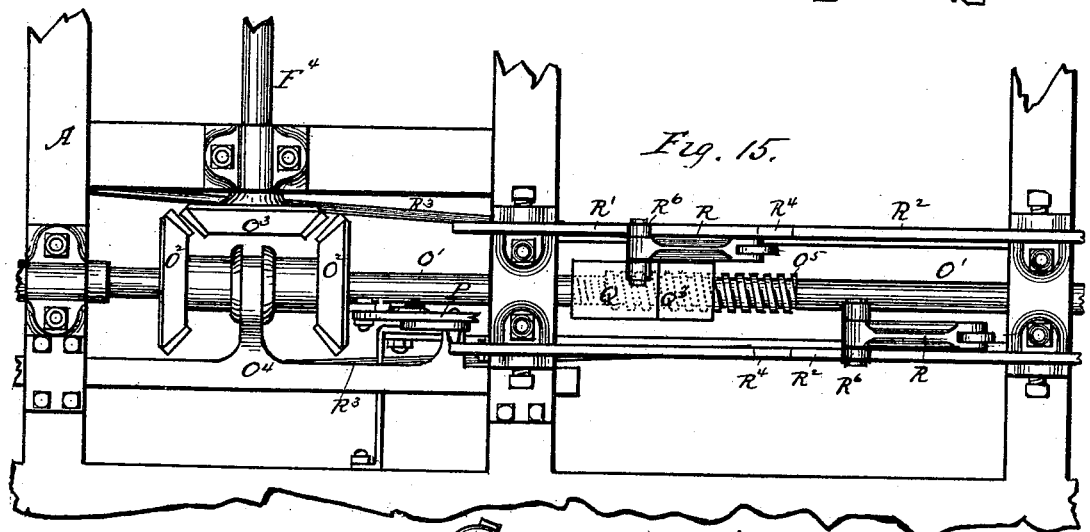
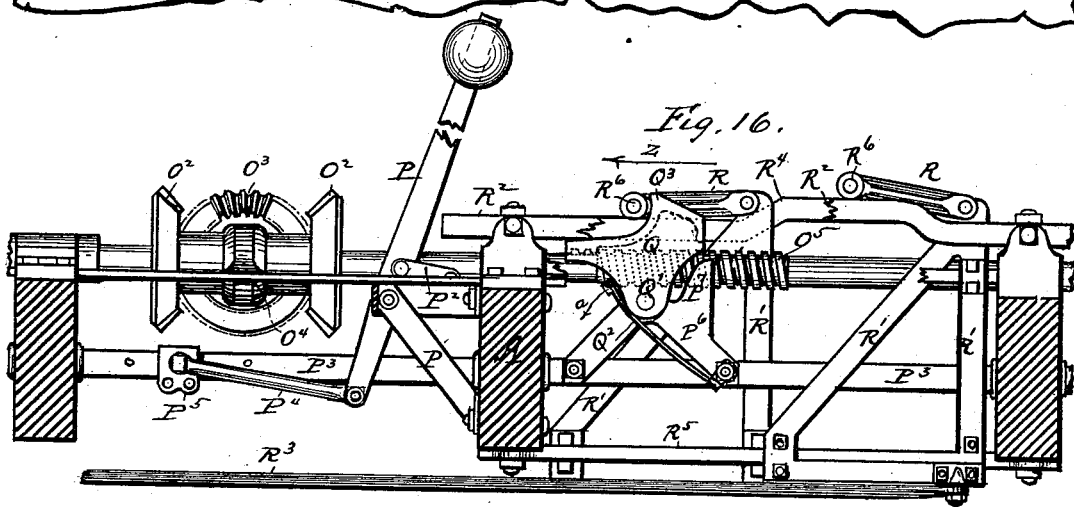
Witnesses:
Edw. W. Byrn.
John C. Kenton
Inventor:
L. A. Desy
By Munn & Co.
Attorneys

UNITED STATES PATENT OFFICE.

LOUIS ARSENE DESY, OF WINNIPEG, MANITOBA, CANADA.

DITCHING-MACHINE.

SPECIFICATION forming part of Letters Patent No. 360,282, dated March 29, 1887.

Application filed June 11, 1885. Serial No. 168,419. (No model.)

*To all whom it may concern:*

Be it known that I, LOUIS ARSENE DESY, a subject of the Crown of Great Britain, residing at Winnipeg, Manitoba, Canada, have invented certain new and useful Improvements in Ditching-Machines, of which the following is a description.

This invention relates to that class of ditching-machines which move themselves on the ground and excavate a ditch in the path of the machine.

The invention has for its object to dig a trench of a given slant on its side embankments, to raise the earth from the ditch, and to discharge it to one side thereof.

To this end it consists in means for guiding the propelling-wheels; means for raising and lowering the rear end of the machine, thereby gaging the depth of ditch; means for rotating the excavator from side to side on a vertical pivot, whereby a deep central groove with equally-inclined banks will be dug, and means for advancing the machine intermittently at times having a fixed relation to the semi-rotations of the excavator, as hereinafter described and claimed, reference being had to the accompanying drawings, in which—

Figure 1:
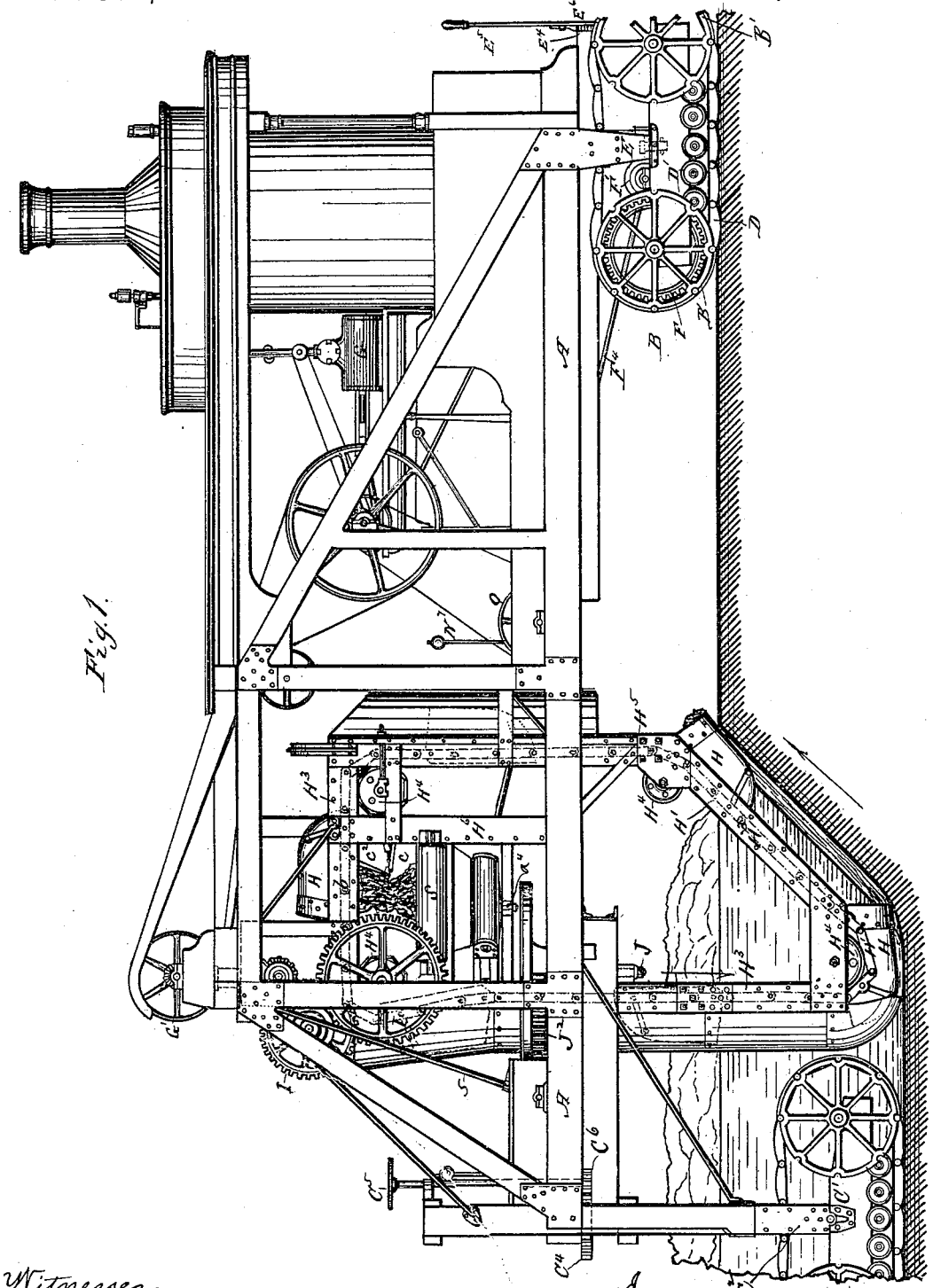
Figure 11:
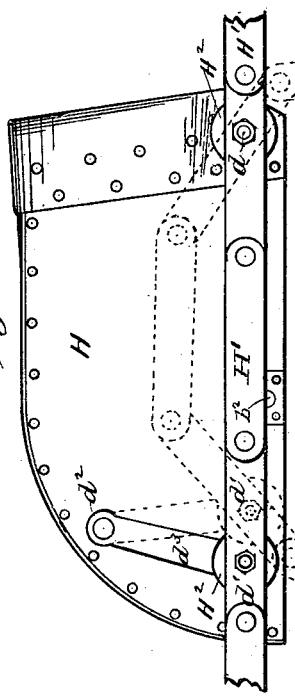
Figure 13:
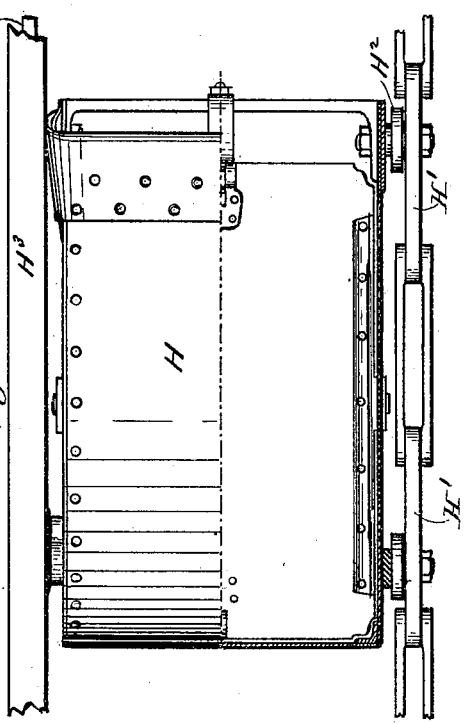
Figure 10:
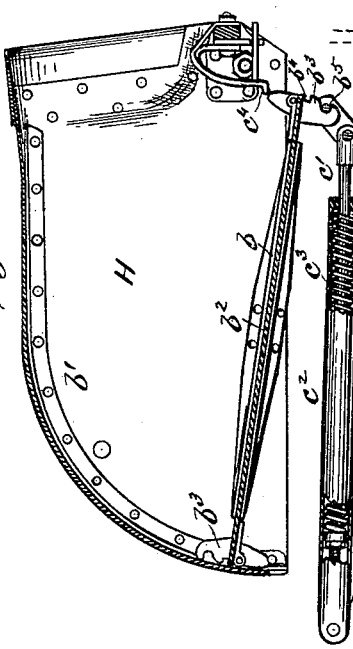
Figure 12:
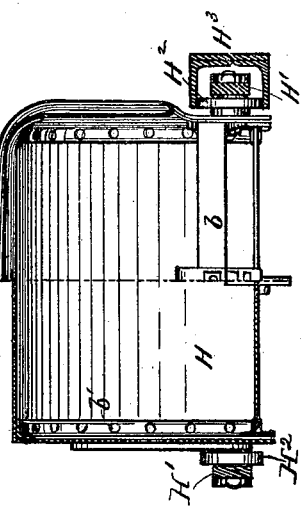

Figure 1 is a side elevation of my ditching-machine in position for work. Fig. 2 is a plan view, and Fig. 3 is a rear view, of the same. Fig. 4 is a fragmentary plan view of a portion of the rear end of the machine. Fig. 5 is a general side elevation of the machine in condition for travel. Figs. 6 and 7 show the same with the scoop-guide in place, making ditches of different depths. Figs. 8 and 9 are plan views showing the excavator and earth-carrier in different positions. Fig. 10 is a longitudinal sectional elevation of a scoop and the cleaning device therefor. Fig. 11 is a side elevation of a scoop, showing its attachment to the chain-belts. Fig. 12 is a front end view of the same, partly in section. Fig. 13 is a plan view, half in section, of a bucket, one side chain, and the chain-track on the other side. Fig. 14 is a fragmentary view of a portion of the steering apparatus. Fig. 14$^a$ is a vertical sectional view through one of the front trucks. Fig. 15 is a plan view; and Fig. 16 is a transverse vertical section midway the machine, showing the timing device which governs the forward feed or advance of the machine. Fig. 16$^a$ is a cross-section through the screw-shaft O$^5$. Fig. 16$^b$ are sectional side views of the screw-shaft O$^5$ and nut Q, showing the relative positions for different directions of travel. Fig. 17 is an enlarged elevation of a shifter-tripping device shown in Fig. 4.

A represents the frame of the machine, which is mounted on three trucks, B B C. Each truck consists of two broad faced wheels, B', around which travels a belt, D, made up of staves secured at their ends upon chains. These stave-belts are common as an expedient for giving the wheels greater bearing-surface for the purpose of supporting very heavy vehicles upon soft earth.

D' represents a series of rollers journaled to the truck in a horizontal plane between the wheels B', to give greater bearing-surface to the stave-belt on the machine. Each of the forward trucks B is centrally pivoted to the frame A on a vertical axis, E, Figs. 1 and 14, and provided with a toothed segment, E', engaged by a pinion, E$^2$, which communicates with a hand-lever, E$^5$, by means of beveled gears E$^3$, a shaft, E$^4$, and a pawl and ratchet, E$^6$, whereby the trucks B, both acted upon at once, may be turned to the right or left by the operator to guide the machine. When the trucks have been set either for a straight line or a curve, the machine will continue to follow that course until the course of the guide-trucks is changed.

F is a spur-wheel secured upon one wheel, B', of each forward truck.

F' is a pinion, gearing through intermediate wheels with the wheel F, and journaled in the truck-frame. F$^3$, Fig. 14, represents a pair of beveled gears, which receive power from the engine G through a shaft, F$^4$. The wheels F$^3$ are connected with the pinion F' by a shaft, F$^5$, which is provided with universal joints F$^2$, and with a splined telescoping joint, F$^6$. By this means the beveled wheels F$^3$ may be journaled in fixed bearings in the frame of the machine, and yet communicate rotary motion to the pinion F', whose bearings move out of line therewith, and change in distance therefrom in following the angle of the trucks, as shown in dotted lines, Fig. 14. H, Fig. 1, represents a series of scoops mounted on chains H', Figs. 11, 12, and 13, which are provided with rollers H$^2$, fitted to run in shields or hollow rails H³. The scoops H and chains H' are revolved around rollers H⁴, to one of which power is applied from the engine G by means of the gear-wheels I, communicating with the pulley G' through shafts 6, 1, and 8, and bevel-gears 3 and 4, as shown in Fig. 3, power being derived from pulley G', which is belted to the engine. The scoops are revolved by their chains in the direction of the arrows, Fig. 1, to cut from the bottom of the ditch upward after the full depth of the ditch has been started. All of that portion of the excavator H H³ H⁴ shown below the plane of H⁵ is removable from the machine to be out of the way, as in Fig. 5, in traveling from place to place. When in use, this portion always depends below the frame to the distance shown. The truck C, Figs. 1 and 3, is transversely pivoted at C' in a vertically-adjustable frame, C², so as to remain level, or with both its wheels on the ground on any incline fore and aft, whether the machine-frame is level, as in Fig. 5, or inclined forward or rearward, as in Figs. 6 and 7, respectively.

C³, Fig. 3, is an elevating-screw fixed in the frame C², so that a screw-nut, C⁴, which is a spur gear-wheel journaled in the frame A, may be revolved thereon by the hand-wheel C⁵ and pinion C⁶, Figs. 1 and 4, to raise or lower the rear end of the frame A and the excavator thereto attached. The truck C travels directly in the path of the excavator—that is, on the bottom of the ditch. The chain of scoops makes a number of revolutions to each revolution of the advancing drive-wheels B', so as to fully clear the earth from the ditch. The rear end of the machine, as shown in Fig. 5, has to be raised high up on the truck C by the screw C³, to admit the excavator. Now, if the machine be started and the excavator be set to cut a little lower than the wheels of trucks C, the advance of the machine will cause the said truck to gradually descend in the path dug ahead of it until the proper depth of the ditch is attained. Then the operator should raise the excavator to the exact level of the truck-path, when the machine will continue to dig the ditch at that depth, advancing as in Fig. 7. Now, by raising the excavator a little it will leave some earth in front of the truck for it to rise upon, so that the excavator will be gradually raised out of the ground as it advances. The rapidity of descent into the ground and rise out of it depends on the amount which the excavator is set lower or higher than the tread of the truck C. The whole excavator H H³ is mounted on a vertical axis, J, Figs. 1, 2, and 4, and a semicircular track, J', in the frame A, and is geared to oscillate on this semicircle while slowly and intermittently advancing. Thus the front end of the ditch is in the form of an inverted conic frustum vertically bisected transversely to the ditch.

J², Figs. 1, 2, and 4, is a half-circular toothed segment mounted on the axis J, engaged by a pinion, J³, Fig. 4, which is connected by shafts J⁴ and J⁵, and beveled gears thereon with a reversing clutch-gear, K², on a shaft, K. This shaft K is continually revolved in one direction by a train of gear wheels, K', connecting, (see Figs. 3 and 4,) through shafts 5 and 6 and bevel-gears 7 and 2, with pulley G', which is revolved by the engine, as before described. By this means the axis J and the excavator mounted thereon are revolved. This revolution is limited to oscillating in a half-circle, as follows: At each extremity of the segment J² a pin, J⁶, Figs. 2 and 4, is fixed to engage a lug, L, on a rod, L', connected with a shifter, L³, by means of a reversing-lever, L², a balance-lever, L⁴, and a connecting-rod, L⁵. L⁶ represents two springs secured at their outer ends upon the shifter L³, to slide to and fro therewith.

M, Figs. 17 and 4, is a wedge-block having a wedge at each end, and a shouldered block, M', rising in the middle above the butts of the wedges. This wedge-block is connected by a link or rod, M⁴, with the balance-lever L⁴. The beveled gears K² are splined to slide upon the shaft K, to engage either edge of a beveled gear on shaft J⁵, whereby a continuous revolution of shaft K in one direction may be transmitted to shaft J⁵, to revolve the latter in either direction, whereby the segment J² is reciprocated. When the segment in its revolutions approaches either extremity of its movement, one of the pins J⁶ strikes the lug L, and through the connections described tilts the lever L⁴, whereby the wedge M is driven under one of the springs L⁶, raising it so that a wing, M³, thereof is above a fixed catch-block, M². Then the continued motion of the lever L⁴, pushing the block M' against the end of the raised spring, drives it and the shifter-rod L³, to which it is attached, along, thus disengaging one of the gears K², and engaging the other with the gear on shaft J⁵. This reverses the motion of the segment J², and the wing M³ on the other spring L⁶ catching on one of the blocks M² holds the clutch-gears engaged until the opposite pin, J⁶, arrives at the lug L, when this other spring L⁶ will be released and the operations reversed. The weight at the end of lever L⁴ causes it to fall to either end of its arc of motion when tipped past center, thus quickly engaging and disengaging the gears when once started. The segment J² and the pins J⁶ bear such relation to the excavator that the shifting takes place when the excavator-scoops reach each side of the ditch. To automatically raise or lower the frame A upon the screw C³, the spur-wheel C⁴ is revolved by the pinion C⁶ on the shaft of the hand-wheel C⁵, when a beveled wheel, N, on the shaft of the hand-wheel is engaged by a beveled wheel on the coupling-shaft N'. The said shaft N' is journaled in a frame, N³, which is pivoted to swing the wheels on the shaft into and out of engagement with the beveled wheels N and N². The wheel N², being on the same shaft as the wheel J³, will be revolved one way half the time and the other way half the time while at work, as before described, so that if the wheels N and $N^2$ be connected at one time the frame A will be raised, while if they be connected at another time the frame will be lowered. The frame $N^3$ is connected by rods $N^4$ and $N^6$, and an elbow-lever, $N^5$, with the hand-lever $N^7$, Fig. 1, whereby the operator may operate the screw-nut $C^4$ at will. I find the excavator works to the best advantage when the machine is advanced intermittently while the excavator is working at the sides of the ditch first at one side then at the other, so that a slice of even thickness all the way around the end of the ditch will be taken at each traverse of the excavator.

If the advance of the machine were constant and regular, each traverse of the excavator would begin on the thin end of a wedge and end at the thick end, and this thick end would be the measure of two traverses or a complete traverse to and fro. To avoid this, I have devised a peculiar feed-motion. The shaft $F^4$, Figs. 1, 14, and 15, which communicates motion from the engine G to the propelling truck-wheels $B'$, is connected with the engine by means of a shaft, $O'$, and a pulley, $O$, thereon which communicates directly with the engine by belt. (Figs. 1 and 2.)

$O^2$, Figs. 15 and 16, represents two beveled gear-wheels, joined as one by a sleeve which is splined to slide longitudinally upon the shaft $O'$, in order that communication may be had with either edge of a beveled wheel, $O^3$, on shaft $F^4$, whereby a continuous rotary motion in one direction of the shaft $O'$ may produce intermittent rotary motion in opposite directions to the shaft $F^4$; but in general use the backing motion is seldom required. Therefore I have only to consider the engagement and disengagement of one wheel $O^2$ with the wheel $O^3$ in advancing and stopping.

$O^4$ is the shifter, fitted to slide in the frame longitudinally with shaft $O'$, and engaging the sleeve of the wheels $O^2$.

P is a weighted lever pivoted to a bracket, $P'$, of the main frame A, and connected with the shifter $O^4$ by a link, $P^2$.

$P^3$ is a rod fitted to slide in the main frame, and provided with a series of holes, into any one of which the bolt of a block, $P^5$, may enter to secure the block on the rod.

$P^4$ is a link connecting the block with the lever P, so that through the connections described any motion of the rod $P^3$ is communicated to the wheels $O^2$ to shift them.

$P^6$ is a bracket secured upon the rod $P^3$, to move therewith.

Q is a nut having a segment of screw-thread adapted to engage a screw, $Q^5$, on the shaft $O'$, and pivoted at $Q'$ to the bracket $P^6$.

$Q^2$ is a spring, which presses the nut Q in the direction of the curved arrow $a$ into engagement with the screw $O^5$.

R is a pawl pivoted at one end to a bracket, $R'$, and provided with two side rollers, $R^6$, one of which is adapted to engage a hook, $Q^3$, on the nut Q, and the other is adapted to roll on an adjustable rail, $R^2$, having in it a rising incline, $R^4$. The bracket $R'$ is fitted to slide on a rail, $R^5$, and is connected with a rod, $R^3$, by which it is operated, the rod $R^3$ being connected with rod $L'$ (see Fig. 4) by a link, $R^9$, an elbow-lever, $R^8$, a rod, $R^7$, and an elbow-lever. The general connection is shown in Figs. 2 and 4, and the details on a larger scale in Figs. 15 and 16.

In service the lug L is operated by the pins $J^6$ at each traverse of the excavator, as before described. The elbow-lever is double, each end connecting with a rod, $R^3$, there being two rods, $R^3$, and two sets throughout of the devices operating on the one nut Q. The screw $O^5$ revolves continually in the direction to move the nut in the direction of the arrow $z$; but in the normal position of the nut Q the threads of the nut and screw are out of engagement, as shown in Fig. 16. Now, when the rod $L'$, Fig. 4, is shifted either way, one of the pawls R engages the hook $Q^3$ and carries it in the direction of the right-hand arrow in Fig. $16^b$, until one of the rollers $R^6$ runs up the incline $R^4$, which disengages the other roller from the hook $Q^3$, leaving the nut free to be sprung into the screw, as shown on the left of Fig. $16^b$. In thus carrying back the nut Q one of the wheels $O^2$ is, by means of the connections described, engaged with the wheel $O^3$, and the machine set to feeding or slowly propelling itself forward; but the nut Q, being engaged with the screw, is slowly withdrawing the same wheel $O^2$ from engagement. When this disengagement takes place, the advance of the machine is stopped, while the excavator continues to complete the circuit of the end of the ditch. When it reaches the side thereof, a pin, $J^6$, Fig. 4, actuates the rod $L'$ to shift the elbow-lever and its attachments, whereby the other pawl R engages the nut Q and sets the machine to advancing, as before. The rods $R^2$ are longitudinally adjustable to move the incline $R^4$, so as to give the nut more or less range on the screw, thereby advancing the machine to take larger or smaller cuts. When one pawl R goes back with the nut, the other rides forward over the incline of the hook $Q^3$ into position for service in its turn. When the pawl begins pulling on the hook $Q^3$, it first tips the nut back to a rest on the shoulder $P^7$ of the bracket $P^6$, thus holding the nut-thread above the screw-thread while passing over it. The action of either pawl is the same—that is, to draw the nut back and drop it into engagement with the screw.

S, Figs. 1 and 2, represents a short belt or apron placed beneath the delivery of the excavator-scoops, revolved by beveled gears $S'$, Fig. 2, connecting with the shaft of wheel I, to carry the earth to one side upon a delivery belt, $S^2$.

$S^3$ represents a pair of side boards, to guide the dirt upon the belt $S^2$. The belt $S^2$ is driven by the roller $S^4$ at its outer end, so that its action may be to draw upon the load received upon its upper end. The roller $S^4$ has a beveled gear engaging a beveled guide-wheel, S⁷, on a shaft, S⁵, which is provided with a universal joint, S⁶. The shaft also slides endwise on a spline through the wheel S⁷, by which means the shaft may receive rotary motion through the universal joint while out of line, and the shaft slides out and in to accommodate the varying position of the end of the delivery-belt. This varying is caused from the fact that the excavator constantly delivers at one side, and that delivery changes position as the excavator works from side to side of the ditch, as shown in Figs. 8 and 9. The inner end of the shaft S⁵ is provided with a beveled gear, which receives power from a shaft, S⁸, which is geared with the shaft O', before described. The frame $a^3$ of the delivery-belt S² is carried at its outer end by a bail, $a$, Fig. 3, hung upon an outrigger, $a'$, of the frame A, and it is fitted to slide out and in through the bail. The inner end of frame $a^3$ is journaled at $a^4$, Fig. 1, on a vertical pivot in the frame H⁶ of the excavator, so that its outer end may remain in the yoke while the excavator turns from side to side.

The earth which is dug from ditches is usually sticky and will not fall by gravity from the scoops. On this account I have devised means for forcibly clearing the scoop at each revolution of the chain of scoops. The back $b$, Fig. 10, of each scoop is centrally pivoted between the sides, and the rear end of the scoop is a quadrant of a cylinder concentric with the pivot $b^2$ and of equal radius with the back $b$, so that the back in revolving within the scoop scrapes the earth therefrom. Each end of the back $b$ is provided with a latch, $b^3$, having one notch, $b^4$, adapted to be held by a spring-catch, $c^4$, to keep the back in place while earth is being scraped up and carried, and another notch, $b^5$, in an end of the latch which projects from the back. $c$ is a catch pivoted at one end to the frame H⁶ of the excavator, and provided with a pin at the other end, located in the path of the latch $b^3$, to engage the notch $b^5$ as the scoop passes on its revolutions. This catch $c$ is located over the short belt S, Fig. 1, and by catching the latch $b^3$ it first unhooks the same from the spring $c^4$, and as the scoop continues advancing the forward end of the back is retained, causing its rear end to sweep up through the scoop, cleaning the same over the belt S, the scoop being inverted at this time as it passes down over the upper roller, H⁴. As the back $b$ swings outward, the catch $c$ turns on its pivot, and when the outer end of the back passes its center the catch $c$ is caused to hold to it and follow it by a telescoping brace, $c'$ $c^2$, provided with a spring, $c^3$. This brace is pivoted at one end to the frame H⁶ and at the other end to the catch $c$. The catch $c$ holds the latch $b^3$ until the back is thereby completely inverted, and at the instant the opposite latch $b^3$ engages the spring $c^4$ the catch $c$ is released by the notch $b^5$ being inverted. As each scoop passes the catch $c$, the above-described operation is repeated. In passing over small pulleys the two pivots $d$ $d'$, by which the scoop is attached to the chain H', are brought closer together than when the chain is straight. To accommodate this, I connect the pivot $d'$, Fig. 11, with the scoop by means of a link, $d^3$, which is pivoted to the scoop at $d^2$. Thus the pivoted end $d'$ may swing, as shown in dotted lines.

What I claim as my invention, and desire to secure by Letters Patent, is—

1. The combination, in a ditching-machine, of three trucks, each provided with two wheels, one journaled ahead of the other, the rear truck fixed in the central line of the machine and the forward two trucks each pivoted at its own vertical center to the machine, and means, substantially as described, for turning the forward trucks parallel with each other from side to side, as and for the purpose specified.

2. The combination, with two trucks, B, each pivoted on its own vertical center to a ditching-machine, and provided with segmental gears E', of a pinion, E², vertically pivoted to the machine between the two segments and engaging the same, and means for revolving the pinion by hand, substantially as shown and described.

3. The combination of two centrally-pivoted trucks, B, each provided with a toothed segment, E', a pinion, E², pivoted between and engaging the two segments, a shaft, E⁴, beveled gears E³, engaging the said shaft and pinion, a hand-lever, E⁵, and a pawl and ratchet, E⁶, engaging the lever and shaft, substantially as shown and described.

4. The combination of two wheels, B', journaled one ahead of the other, the truck B, mounted on said journals and pivoted centrally to a ditching-machine at either side, and means for turning the truck from side to side, a spur-wheel, F, on the wheel B', a pinion, F', geared therewith and journaled in the truck, a beveled gear, F³, journaled in the frame of the machine, a shaft, F⁴, forming a connecting-link with an engine, a shaft, F⁵, provided with universal joints F², and a telescoping splined joint, F⁶, connecting the wheel F³ with the shaft of the pinion F', substantially as shown and described.

5. The combination of a frame, A, forward trucks, B, secured thereto, a series of scoops, H, secured on a chain, the chain mounted on rollers H⁴, journaled in a frame, H³, extending below the frame A, a rear truck, C, a frame, C², fitted to slide vertically in the frame A, and means for raising and lowering the frame A on said truck, substantially as shown and described.

6. The combination of a series of excavator-scoops, H, secured on a chain, the chain mounted on rollers H⁴, journaled in a frame, H³, the frame H³, vertically journaled in a main frame, A, upon a shaft, J, a semicircular segmental wheel, J², mounted on the shaft J, and provided with pins J⁶ at each extremity of its arc, a pinion, J³, engaging the segment, a shaft, K, connected to be driven by an engine, a pair of beveled gears, $K^2$, loosely splined upon shaft K, shafts $J^4$ and $J^5$, connecting the shaft of the pinion $J^3$ with the wheels $K^2$, a shifter, $L^3$, engaging the wheels $K^2$, a rod, $L'$, provided with a lug, L, in the path of the pins $J^6$, and connections, substantially as described, between the rod $L'$ and the shifter $L^3$, substantially as and for the purpose specified.

7. The combination, with the segment $J^2$, having the pins $J^6$, the shaft K and their connections, of the beveled gears $K^2$, loosely splined on the shaft K, the shifter $L^3$, engaging the sleeve of the gears $K^2$, the springs $L^6$ on the shifter, the rod $L'$, provided with the lug L in the path of the pins $J^6$, the double wedge M, the lever $L^4$, and the connections described, as and for the purpose specified.

8. The combination of the shifter $L^3$, the springs $L^6$, secured thereon and provided with wings $M^3$, the lugs $M^2$, fixed in the path of the wings, the double wedge M, having the shouldered block $M'$ in the path of the springs $L^6$, and the weighted lever $L^4$, connected with the wedge by a link, $M^4$, substantially as shown and described.

9. The combination, with the frame A and the screw $C^3$, fixed therein, of the frame $C^2$, fitted to slide therein and mounted on a truck, C, a toothed wheel, $C^4$, journaled in the frame $C^2$ and internally screw-threaded to fit upon the screw $C^3$, a shaft provided with a pinion, $C^6$, engaging the wheel $C^4$, and a bevel-wheel, N, the bevel-wheel $N^2$, and means for rotating it to and fro, a shaft, $N'$, provided with gear-wheels adapted to engage the wheels N and $N^2$, and mounted in a frame, $N^3$, hung to the main frame, a hand-lever, $N^7$, and connections between it and frame $N^3$, substantially as and for the purpose described.

10. The combination of the screw-threaded shaft $O'$ and means connecting it with the engine to be revolved thereby, the beveled wheels $O^2$, loosely splined thereon, the gear-wheel $O^3$, adapted to engage the wheels $O^2$, and connected with the propelling-wheels of the machine, the shifter $O^4$, engaging the sleeve of the wheels $O^2$, the weighted lever P, pivoted to the main frame and connected with the shifter by a link, $P^2$, a rod, $P^3$, fitted to slide in the frame, a block, $P^5$, securable on the rod, a link, $P^4$, connecting the lever P and block $P^5$, the bracket $P^6$, secured on the rod $P^3$, the nut Q, pivoted upon the bracket and provided with screw-threads at one end adapted to engage the screw $O^5$, and with a hook, $Q^3$, a rod, $R^3$, connected with the reversing-gear described, a bracket, $R'$, secured upon the rod $R^3$, a pawl, R, pivoted to the bracket and provided with rollers $R^6$, one of which is in the path of the hook $Q^3$, and rod $R^2$, adjustably secured to the frame and provided with the incline $R^4$ in the path of the other of the said rollers $R^6$, substantially as shown and described.

11. The combination of a clutch-shifter, $O^4$, a rod, $P^3$, and connections, substantially as described, between them, the bracket $P^6$, the nut Q, pivoted thereon, the spring $Q^2$, the two brackets $R'$ and connecting-rods $R^3$, the pawls R, provided with rollers $R^6$, and the rods $R^2$, having inclines $R^4$, substantially as shown and described.

12. The combination of the screw $O^5$, the bracket $P^6$ on a slide-rod and provided with a shoulder, $P^7$, the nut Q, provided with the hook $Q^3$, and a shoulder to engage the shoulder $P^7$, and the pawl R, adapted to engage the hook, substantially as shown and described.

13. The combination of the screw $O^5$, the nut pivoted to a sliding portion and provided with a hook, $Q^3$, a pawl, R, pivoted to another sliding portion and provided with two rollers, $R^6$, and the rod $R^2$, having the incline $R^4$, substantially as shown and described.

14. The combination, with the scoop H, having a cylindrical rear end, of the back $b$, pivoted midway in the scoop concentric with the said rear end, and provided with latches $b^3$, extending outward from the ends of the back, the spring-catch $c^4$, and a catch located in the path of the latch, substantially as shown and described.

15. The combination of the scoop H, the back $b$, pivoted therein, and provided with latches $b^3$, having notches $b^4$ and $b^5$, the spring-catch $c^4$, the catch $c$, pivoted at one end to the frame, and provided with a pin at the other end in the path of the notch $b^5$, and the telescoping brace $c'$ $c^2$, provided with the spring $c^3$, and pivoted at one end to the frame and at the other end to the catch $c$, substantially as shown and described.

LOUIS ARSENE DESY.

Witnesses:
W. X. STEVENS,
C. A. PETTIT.